US 8,716,891 B2

(12) United States Patent
Choi (10) Patent No.: US 8,716,891 B2
(45) Date of Patent: May 6, 2014

(54) ENERGY STORAGE SYSTEM CONNECTED TO A GRID AND MULTIPLE POWER GENERATION MODULES AND METHOD OF CONTROLLING THE SAME

(75) Inventor: Loo-Ney Choi, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 258 days.

(21) Appl. No.: 12/968,060

(22) Filed: Dec. 14, 2010

(65) Prior Publication Data

US 2011/0144822 A1 Jun. 16, 2011

(30) Foreign Application Priority Data

Dec. 15, 2009 (KR) ........................ 10-2009-0125030

(51) Int. Cl.
*H02J 1/12* (2006.01)

(52) U.S. Cl.
USPC ............................................ 307/71; 323/906

(58) Field of Classification Search
USPC ......... 700/297, 298; 307/66, 71, 82; 323/906; 363/65, 67, 69, 70; 361/187, 189, 190; 320/117
See application file for complete search history.

(56) References Cited

U.S. PATENT DOCUMENTS

| 5,235,232 | A | 8/1993 | Conley et al. | |
|---|---|---|---|---|
| 7,545,052 | B2 * | 6/2009 | Llorente Gonzalez et al. . | 290/44 |
| 8,106,537 | B2 * | 1/2012 | Casey et al. ..................... | 307/82 |
| 2008/0211451 | A1 | 9/2008 | Zhang et al. | |
| 2008/0303503 | A1 | 12/2008 | Wolfs | |
| 2009/0159113 | A1 | 6/2009 | Morimoto | |
| 2009/0212568 | A1 | 8/2009 | Maibach et al. | |
| 2009/0295227 | A1 | 12/2009 | Chang et al. | |
| 2010/0109442 | A1 * | 5/2010 | Vega Betoret et al. .......... | 307/82 |

FOREIGN PATENT DOCUMENTS

| JP | 07-067346 A | | 3/1995 |
|---|---|---|---|
| JP | 2000112545 A | * | 4/2000 |
| JP | 2001-016859 A | | 1/2001 |
| JP | 2001-268800 A | | 9/2001 |
| JP | 2001268800 A | * | 9/2001 |

(Continued)

OTHER PUBLICATIONS

Japanese Office Action dated Jul. 24, 2012 for Japanese Patent Application No. JP 2010-236550 which shares priority of Korean Patent Application No. KR 10-2009-0125030 with captioned U.S. Appl. No. 12/968,060.

Korean Office Action dated Mar. 24, 2011 for Korean Patent Application No. KR 10-2009-0125030 which corresponds to the captioned application.

(Continued)

*Primary Examiner* — Adolf Berhane
*Assistant Examiner* — Jye-June Lee
(74) *Attorney, Agent, or Firm* — Knobbe Martens Olson & Bear LLP (57) ABSTRACT

A grid-connected energy storage system capable of increasing the efficiency of a converter and a method of controlling the system are disclosed. In one aspect, the system includes a plurality of converters for converting power generated by each of the plurality of power generation modules into DC power at a voltage level, a plurality of series switches connected to the plurality of power generation modules, and a plurality of parallel switches configured to selectively connect each of the power generation modules to each and every other of the power generation modules. The system also includes a controller configured to control the switches in order to selectively connect each of the power generation modules to at least one selected converter.

10 Claims, 4 Drawing Sheets

(56) References Cited

FOREIGN PATENT DOCUMENTS

| | | |
|---|---|---|
| JP | 2002073184 A * | 3/2002 |
| JP | 2004-319812 (A) | 11/2004 |
| JP | 2005-151662 (A) | 6/2005 |
| JP | 2007-133765 A | 5/2007 |
| KR | 2007-0009497 (A) | 1/2007 |

OTHER PUBLICATIONS

Extended European Search Report dated Jan. 30, 2013 of European Patent Application No. EP 10 25 2115.0 which shares priority of Korean Patent Application No. KR 10-2009-0125030 with captioned U.S. Appl. No. 12/968,060.

* cited by examiner

ENERGY STORAGE SYSTEM CONNECTED TO A GRID AND MULTIPLE POWER GENERATION MODULES AND METHOD OF CONTROLLING THE SAME

CROSS-REFERENCE TO RELATED APPLICATIONS

This application claims the benefit of Korean Patent Application No. 10-2009-0125030, filed on Dec. 15, 2009, in the Korean Intellectual Property Office, the disclosures of which are incorporated herein in their entirety by reference.

BACKGROUND

1. Field

The disclosed technology relates to a grid-connected energy storage system that is connected to a power generation system where the grid supplies power to a load, and a method of controlling the system.

2. Description of the Related Technology

Recently, greater interest has been placed in developing renewable energy technologies. Studies on renewable energies have been actively conducted in many countries, because through use of renewable energies, exhaustion of fossil energy and environmental problems can be addressed. In particular, because solar power generation systems generate power by using solar energy, which is a renewable resource, and because solar power generation systems do not cause pollution and require little maintenance, solar power generation systems have attracted much attention. Such renewable energy power generation systems convert power with the use of one converter for a plurality of power generation modules. Thus, when the amount of generated energy is different for each module, the efficiency of the converter is deteriorated.

SUMMARY OF CERTAIN INVENTIVE ASPECTS

One aspect is a energy storage system connected to a grid and a plurality of power generation modules. The system includes a plurality of converters for converting power generated by each of the plurality of power generation modules into DC power at a voltage level, a plurality of series switches connected to the plurality of power generation modules, and a plurality of parallel switches configured to selectively connect the plurality of power generation modules to one another. The system also includes a controller configured to control the plurality of series switches and the plurality of parallel switches in order to selectively connect each of the power generation modules to at least one selected converter, where the selected converter is selected from the plurality of converters based on the power generated by each of the plurality of the power generation modules.

Another aspect is a method of controlling an energy storage system that is connected to a plurality of power generation modules, to a grid, and to a load. The method includes measuring power generated by each of the plurality of power generation modules, and connecting one or more of the power generation modules to a selected converter by controlling a plurality of series switches connected to each of the plurality of power generation modules and a plurality of parallel switches selectively connecting the plurality of power generation modules to one another. The selected converter is selected from a plurality of converters based on the generated power of the plurality of power generation modules. The method also includes converting power from the one or more power generation modules into DC power at a voltage level with the selected converter.

BRIEF DESCRIPTION OF THE DRAWINGS

These and/or other aspects will become apparent and more readily appreciated from the following description of various embodiments, taken in conjunction with the accompanying drawings of which.

DETAILED DESCRIPTION OF CERTAIN INVENTIVE EMBODIMENTS

Certain exemplary embodiments are described in detail with reference to the attached drawings. Like reference numerals generally designate like elements throughout the specification. In the description, the detailed descriptions of well-known functions and structures may be omitted so as not to hinder the understanding of various inventive aspects. Certain embodiments relate to a grid-connected energy storage system having high efficiency use of a converter and a method of controlling the system.

Figure 1:
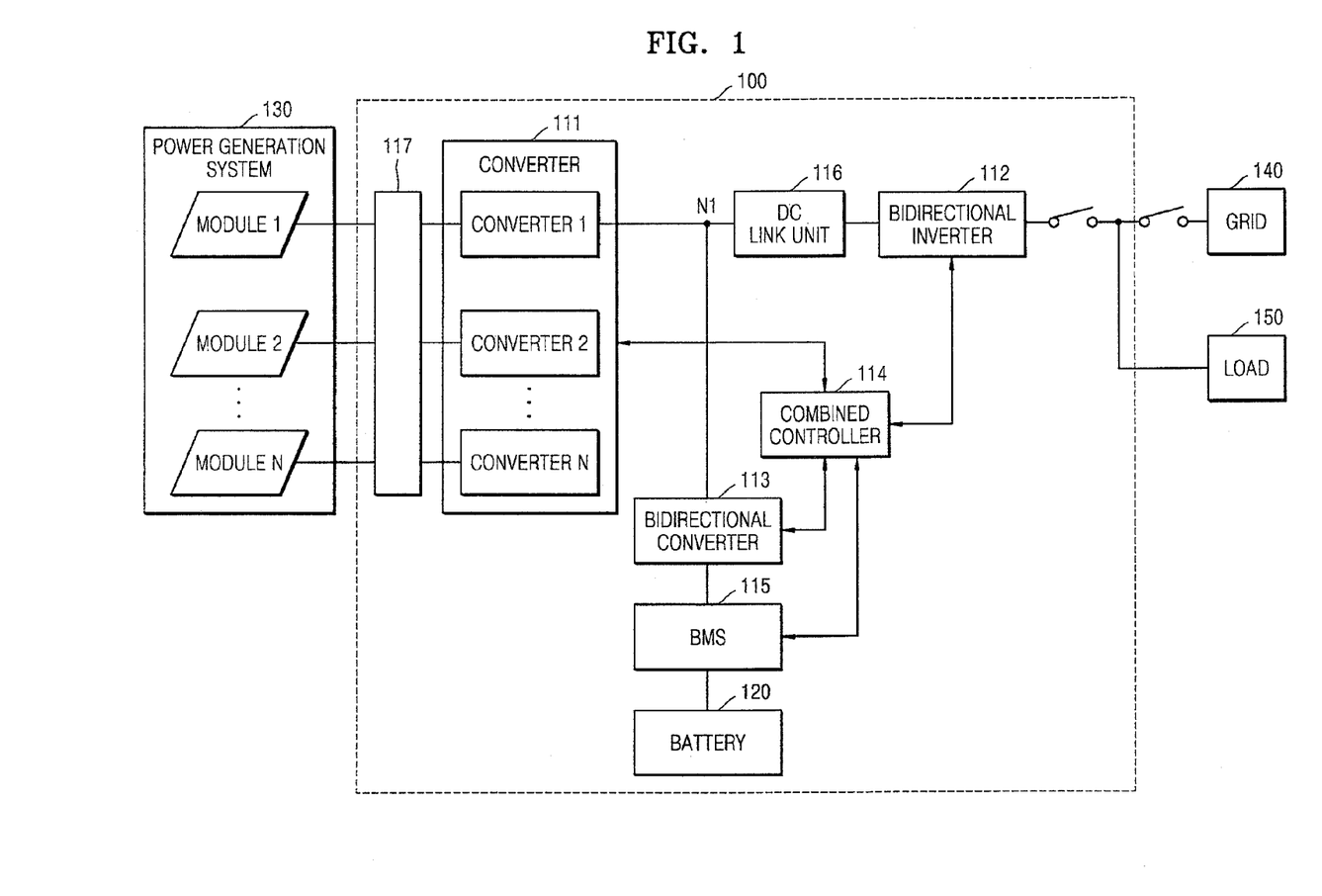
FIG. 1 is a schematic block diagram illustrating a grid-connected energy storage system according to an embodiment.

FIG. 1 is a schematic block diagram illustrating a grid-connected energy storage system 100 according to an embodiment.

Referring to FIG. 1, the grid-connected energy storage system 100 (hereinafter, an energy storage system) is connected to a power generation system 130, a grid 140, and may supply power to a load 150.

The power generation system 130 generates electrical energy with an energy source and outputs the electrical energy to the energy storage system 100. The power generation system 130 may be, for example, a solar power generation system, a wind power generation system, or a tidal power generation system, and may be a renewable energy source, such as solar heat or geothermal heat. In particular, a solar cell generates electrical energy from sunlight and may be easily installed in a house or a factory, and thus may be appropriately used with the energy storage system 100, which may be installed in houses. The power generation system 130 includes a plurality of power generation modules 1 through n that are connected in parallel, and each power generation module generates electrical energy. In some embodiments, the power generation system 130 is a large-capacity energy system.

The grid 140 may include a power station, a substation, a power line, etc. When the grid 140 is in a normal state, the grid 140 can supply power to the energy storage system 100 and/or the load 150 and can receive power supplied from the energy storage system 100. When the grid 140 is in an abnormal state, the grid 140 does not supply power to the energy storage system 100 or the load 150, and the energy storage system 100 does not supply power to the grid 140.

The load 150 consumes power generated by the power generation system 130, power stored in a storage device 120, or power supplied by the grid 140. The load 150 may be, for example, a house or a factory.

The energy storage system 100 may store power generated by the power generation system 130 in the storage device 120, send generated power to the grid 140, send power stored in the storage device 120 to the grid 140, and store power supplied by the grid 140 in the storage device 120. The energy storage system 100 may supply power to the load 150 during abnormal situations, for example, during a power outage in which the grid 140 is unable to supply power, by performing an uninterruptible power supply (UPS) operation. Also, the energy storage system 100 may supply power generated from the power generation system 130 or power stored in the storage device 120 to the load 150, even when the grid 140 is in a normal state.

The energy storage system 100 may include a converter 111, a bidirectional inverter 112, a bidirectional converter 113, a combined controller 114, a battery management system (BMS) 115, a direct current (DC) link unit 116, and a switching device 117.

The converter 111 is connected between the power generation system 130 and a first node N1 and sends power generated from the power generation system 130 to the first node N1. Operation of the converter 111 may vary according to the type of the power generation system 130. When the power generation system 130 is a wind power generation system or a tidal power generation system that outputs AC power, the converter 111 converts the AC power of the power generation system 130 into DC power and outputs the DC power to the first node N1. When the power generation system 130 is a solar cell that outputs DC power, the converter 111 receives DC power from the power generation system 130 and supplies DC power to the first node N1. In some embodiments, the converter 111 performs a maximum power point tracking (MPPT) control so as to obtain maximum power generated by a solar power generation system, a wind power generation system, or a tidal power generation system according to the combined controller 114. The converter 111 includes converters 1 through n respectively corresponding to the plurality of power generation modules 1 through n of the power generation system 130. The converters 1 through n may be selectively connected to the power generation modules 1 through n via the switching device 117. The switching device 117 may connect power generation modules to at least one converter simultaneously or one at a time.

The DC link unit 116 may be connected between the first node N1 and a bidirectional inverter 112 to maintain the DC voltage level of the first node N1 at a DC link level. The voltage level at the first node N1 may be unstable due to instantaneous voltage sagging of the power generation system 130 or the grid 140 or peak load generation in the load 150. However, the voltage at the first node N1 is preferably stable for normal operations of the bidirectional converter 113 and the bidirectional inverter 112. The DC link unit 116 may stabilize the DC voltage level at the first node N1, and the DC link unit 116 may include a capacitor. The capacitor may be an aluminum electrolytic capacitor, polymer capacitor or a high voltage and large current multi layer ceramic capacitor (MLCC). In some embodiments, the DC link unit 116 is formed as an individual element, but the DC link unit 116 may be formed inside the bidirectional converter 113, the bidirectional inverter 112, or the converter 111.

The bidirectional inverter 112 is a power converter connected between the first node N1 and the grid 140. The bidirectional inverter 112 rectifies an AC voltage from the grid 140 to generate DC power to be stored in the storage device 120. The bidirectional inverter 112 also converts a DC voltage from the power generation system 130 or the battery 120 into an AC voltage to be output to the grid 140. The bidirectional inverter 112 may also include a filter for removing certain frequency components from the AC voltage that is to be output to the grid 140, and may perform various other functions, such as limiting voltage changes, improving power factor, removing DC components, protecting against transient phenomena, etc.

The bidirectional converter 113 is a power converter connected between the first node N1 and the battery 120. The bidirectional converter 113 converts a DC link voltage at the first node N1 into a DC voltage to be stored in the battery 120 and converts a voltage stored in the battery 120 into a DC link voltage level to be transmitted to the first node N1. For example, when DC power generated from the power generation system 130 or AC power supplied from the grid 140 is stored in the battery 120, the bidirectional converter 113 may operate as a buck converter for adjusting the DC link voltage level of the first node N1 to a battery storage voltage. When power charged in the battery 120 is supplied to the grid 140 or the load 150, the bidirectional converter 113 may also operate as a boost converter for adjusting the battery storage voltage to the DC link voltage level at the first node N1.

The battery 120 stores power supplied from the power generation system 130 or the grid 140. The battery 120 may be any of various types of battery cells. For example, the battery 120 may be a nickel-cadmium battery, a lead storage battery, a nickel metal hydride battery (NiMH), a lithium ion battery, or a lithium polymer battery. There may be a plurality of batteries which form the battery 120. The number of batteries may be determined based on power capacity, design conditions, or the like required in the energy storage system 100.

The BMS 115 is connected to the battery 120 and controls charge and discharge operations of the battery 120 according to the combined controller 114. Discharge current and charge current are respectively transmitted from the battery 120 to the bidirectional converter 130 and from the bidirectional converter 130 to the battery 120 via the BMS 115. The BMS 115 may also includes various features, such as overcharge protection, overdischarge protection, overcurrent protection, overvoltage protection, overheat protection, cell balancing, etc., in order to protect the battery 120. For this, the BMS 115 may monitor voltage, current, temperature, the amount of power remaining, the life span, etc., of the battery 120, and may send the information to the combined controller 114. In some embodiments, the BMS 115 is separately formed from the battery 120, but the BMS 115 and the battery 120 may be integrated in a battery pack.

The combined controller 114 receives information including voltage, current, temperature, etc., about the grid 140 from the grid 140. The combined controller 114 determines whether an abnormal situation has occurred in the grid 140 based on the information about the grid 140. When the grid 140 is in an abnormal state, the combined controller 114 outputs power stored in the battery 120 or power generated by the power generation system 130 to the load 150 and prevents power from being supplied from the energy storage system 100 to the grid 140.

Discharge current and charge current are respectively transmitted from the battery 120 to the bidirectional converter 113 and from the bidirectional converter 113 to the battery 120 via the BMS 115.

The combined controller 114 transmits a pulse width modulated (PWM) control signal that controls a switching operation of each of the converter 111, the bidirectional inverter 112, and the bidirectional converter 113. The PWM control signal minimizes losses due to power conversions performed by the converter 111, the bidirectional inverter 112, and the bidirectional converter 113 through having a duty ratio optimally controlled according to an input voltage of each of the converter 111, the bidirectional inverter 112, and the bidirectional converter 113. For this, the combined controller 114 receives signals corresponding to voltage, current, and temperature sensed at each input terminal of the converter 111, the bidirectional inverter 112, and the bidirectional converter 113 and sends a converter control signal and an inverter control signal on based on the sensing signals. The combined controller 114 measures output power of each of the power generation modules 1 through n of the power generation system 130 and selectively connects the power generation modules 1 through n to the converter 111. The operation of selectively connecting the converter 111 with respect to the combined controller 114 is described below.

Figure 2:
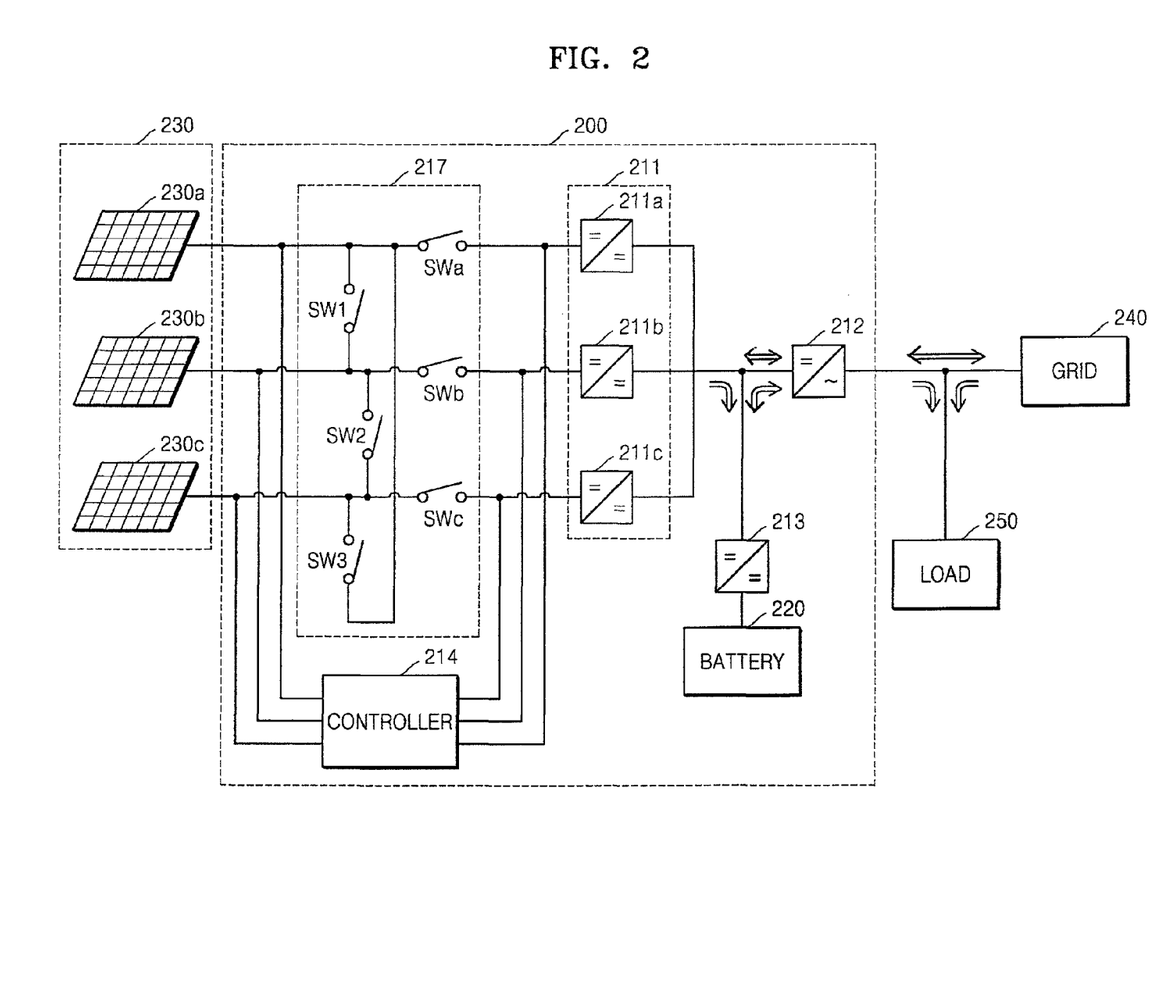
FIG. 2 is a detailed view illustrating a switching device connecting a power generation system of the grid-connected energy storage system of FIG. 1 with a converter, according to an embodiment.
Figure 3:
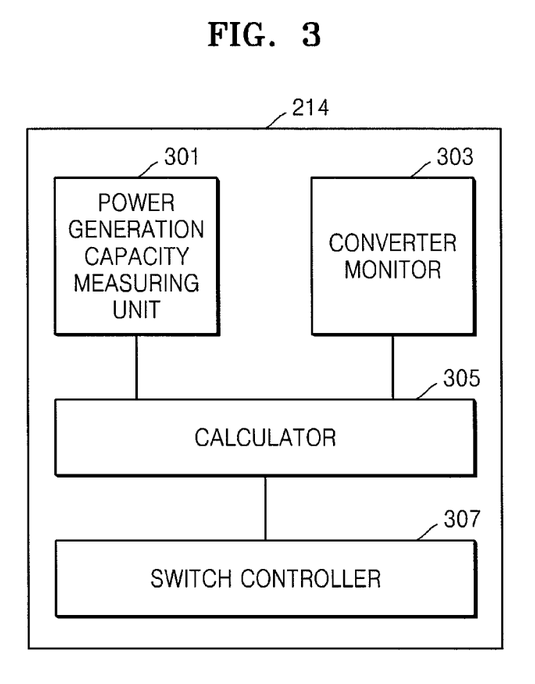
FIG. 3 is a schematic block diagram illustrating an inner structure of a controller of FIG. 2, according to an embodiment.

FIG. 2 is a more detailed view illustrating a switching device connecting a power generation system 230 of an energy storage system 200 with a converter 211, according to some embodiments. FIG. 3 is a schematic block diagram illustrating an inner structure of a controller 214 of FIG. 2, according to some embodiments.

Referring to FIG. 2, an energy storage system 200 is connected to a solar power generation system 230, but the present invention is not limited thereto, and thus the energy storage system 200 may be connected to another power generation system. The energy storage system 200 stores power generated by the solar power generation system 230 in a battery 220 and supplies the power to a grid 240 or a load 250.

The solar power generation system 230 includes a plurality of solar cell modules 230a, 230b, and 230c, wherein the solar cell modules output DC current according to the amount of sunshine exposed thereto. The solar cell modules 230a, 230b, and 230c have different outputs according to the varying conditions thereof, such as solar radiation, temperature, and a drive operating point. Each of the solar cell modules 230a, 230b, and 230c may include a plurality of solar cells connected in series or in parallel in order to obtain a desired output. In the system of FIG. 2, three solar cell modules are illustrated, but more solar cell modules may be formed according to installation location or design in order to obtain a desired amount of power.

A converter 211 converts DC power that is output from the power generation system 230 into DC power at a desired voltage level. The converter 211 includes a plurality of converters 211a, 211b, and 211c connected in parallel and respectively corresponding to the solar cell modules 230a, 230b, and 230c. In FIG. 2, three converters 211 are formed, but more or fewer converters 211 corresponding to the number of the power generation system 230 may be formed. Accordingly, power output by each of the solar cell modules 230a, 230b, and 230c may be individually and independently converted to increase power conversion efficiency of the converter 211. Also, the converters 211a, 211b, and 211c are controlled to selectively operate according to the amounts of power generated by the solar cell modules 230a, 230b, and 230c. For example, each solar cell module may generate a different amount of power according to weather conditions for generating energy, installation location, and installation direction of the solar cell modules 230a, 230b, and 230c. In this case, when all the converters connected to the solar cell modules 230a, 230b, and 230c are operated, the efficiency of the converters is decreased. Accordingly, at least one converter is selectively operated from among the converters 211a, 211b, and 211c according to the amounts of power generated by the solar cell modules 230a, 230b, and 230c in order to increase the efficiency of the converters. The converter 211 is controlled to follow the maximum output point according to the states of the solar cell modules 230a, 230b, and 230c.

A bidirectional inverter 212 rectifies an AC voltage that is input from the grid 240 to a DC voltage to be stored in the battery 220 and outputs the DC voltage. Also, the bidirectional inverter 212 converts a DC voltage that is output from the power generation system 230 or the battery 220 into an AC voltage to be output to the grid 240 and outputs the AC voltage.

In FIG. 2, three converters 211a, 211b, and 211c are formed, but more or fewer converters corresponding to the number of the power generation system 230 may be formed.

The battery 220 stores power supplied from the power generation system 230 or the grid 240. The battery 220 and a BMS (not shown) may be integrated as a battery pack.

A bidirectional converter 213 converts a DC voltage that is output from the power generation system 230 to a battery storage voltage and converts the battery storage voltage to a DC link voltage level to be supplied to the bidirectional inverter 212.

The controller 214 controls the converter 211 according to the maximum output point. For this, the controller 214 measures the amount of power output by the solar cell modules 230a, 230b, and 230c and controls the converter 211 to operate in an operating mode in which the maximum output is generated according to an operation having various algorithms. The controller 214 connects the solar cell modules 230a, 230b, and 230c to the converters 211a, 211b, and 211c via the switch 217 (in such a way as to) optimize power generation efficiency. For example, in some embodiments, the controller 214 measures the amount of power generated by each of the solar cell modules 230a, 230b, and 230c, and prevents a connection between solar cell modules having low amounts of generated power and converters of the converter 211 via the switch 217. In addition, controller 214 connects the solar cell modules having the low amounts of generated power to the same converter in the converter 217, so that power input to the converter is increased, thereby increasing the efficiency of the converter and extending the life span of the converter. Also, the controller 214 periodically monitors the condition of the converter so as to exclude a converter having defects, for example, a converter that has stopped functioning, thereby minimizing errors in the system operation.

Referring to FIG. 3, the controller 214 includes a power generation measuring unit 301, a converter monitor 303, a calculator 305, and a switch controller 307. The controller 214 may be integrated with the combined controller 114 or may be formed separately from the combined controller 114 in FIG. 1.

The power generation measuring unit 301 measures output power Pout of each of the solar cell modules 230a, 230b, and 230c. The output power Pout may be measured periodically or may be measured as desired by an operator depending on a situation.

The converter monitor 203 may periodically monitor and warn about operation conditions and defects of the converters 211a, 211b, and 211c. The converter monitor 203 compiles a database recording defects, replacement time, the number of operations, and operating hours of the converters 211a, 211b, and 211c and periodically or aperiodically updates the database.

The calculator 305 receives power output by each of the solar cell modules 230a, 230b, and 230c from the power generation measuring unit 301, and also receives information about the converters 211a, 211b, and 211c from the converter monitor 203. The calculator 305 compares the power output by each of the solar cell modules 230a, 230b, and 230c with a reference value based on the information.

The converter monitor 303 may periodically monitor and warn about operation conditions and defects of the converters 211a, 211b, and 211c. The converter monitor 303 compiles a database recording defects, replacement time, the number of operations, and operating hours of the converters 211a, 211b, and 211c and periodically or aperiodically updates the database.

The calculator 305 receives power output by each of the solar cell modules 230a, 230b, and 230c from the power generation measuring unit 301, and also receives information about the converters 211a, 211b, and 211c from the converter monitor 303.

Figure 4:
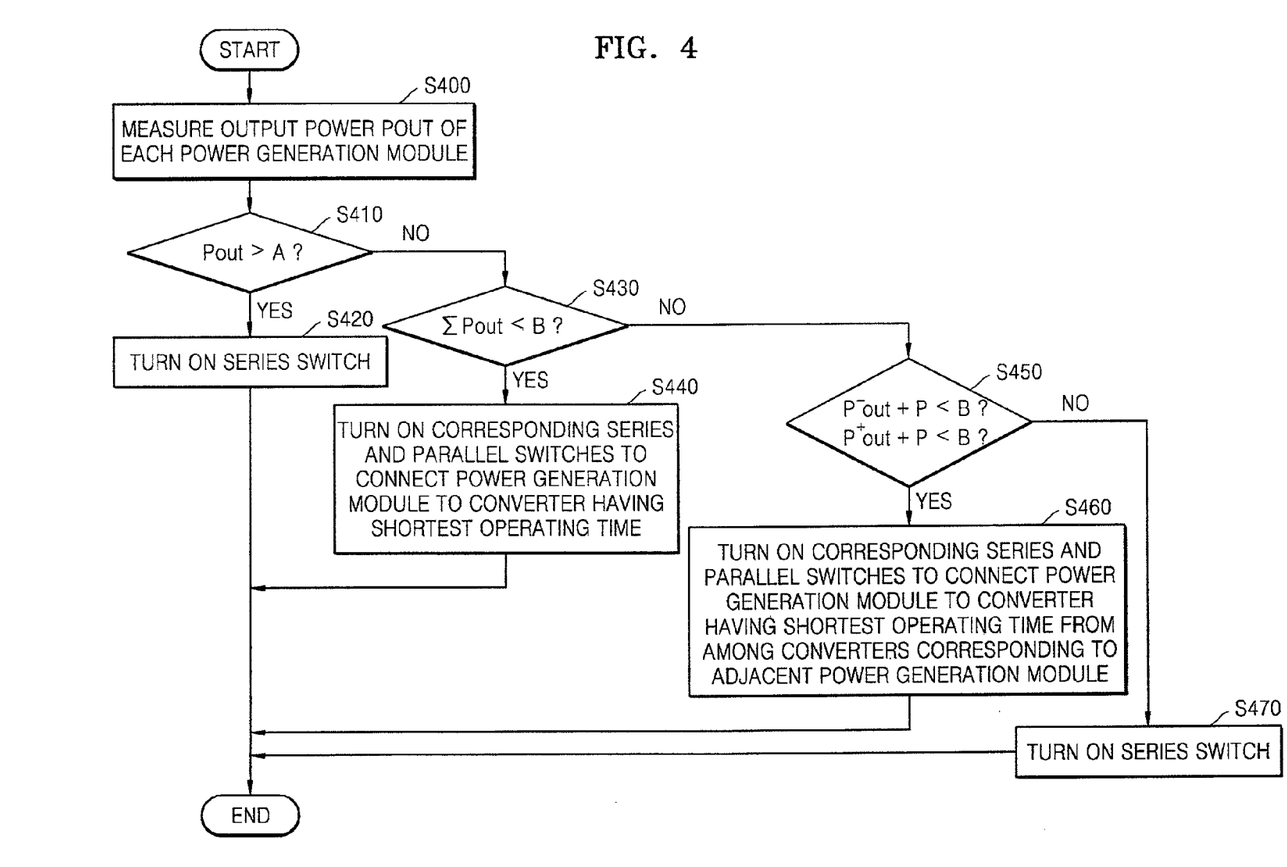
FIG. 4 is a schematic flowchart illustrating a method of controlling a grid-connected energy storage system according to an embodiment.

In S400, power generation measuring unit 301 measures power output by each of power generation modules, that is, an output power Pout. The output power Pout may be measured periodically, aperiodically, or as desired by an operator.

In S410, calculator 305 compares the amount of power output by each of the solar cell modules 230a, 230b, and 230c with a first comparative value A. The first comparative value A may be a percentage of input power required for a converter to output maximum power, for example, 70% of the required input power.

In S420, if there are power generation modules having output power greater than the first comparative value A, the switch controller 307 turns on series switches connected to those power generation modules. The power generation modules having output power greater than the first comparative value A are, therefore, connected to corresponding converters via the series switches, and the connected converters convert power.

In S430, the calculator 305 adds up the amount of power output by each of the remaining solar cell modules, which have output power less than the first comparative value A, and determines whether the sum is less than a second comparative value B. The second comparative value may be a percentage of the input power required for a converter to output maximum power. The second comparative value B may be a value greater than the first comparative value A, for example, 80% of the required input power.

In S440, if the sum is less than the second comparative value B, the switch controller 307 selects a converter having a short operating time from among non-operating converters and connects the power generation modules to the selected converter (S440). To connect each of the power generation modules to the selected converter, corresponding series and parallel switches are turned on.

If the sum exceeds the second comparative value B, in S450, the calculator 305 adds up the amounts of power output by two of the remaining solar cell modules and compares the sum with the second comparative value B. The calculator 305 compares a sum of the amount of power output by one power generation module P and the amount of power output by a previous power generation module P− or the amount of power output by a next power generation module P+ with the second comparative value B.

In S440, if the sum is less than the second comparative value B, the switch controller 307 selects a converter having a short operating time from among non-operating converters and connects the power generation modules to the selected converter.

The calculator 305 compares a sum of the amount of power output by one power generation module $P_{out}$ and the amount of power output by a previous power generation module P−$_{out}$ or the amount of power output by a next power generation module P+$_{out}$ with the second comparative value B.

To connect each of the adjacent two power generation modules to the selected converter, corresponding series and parallel switches are turned on. When both of the sum of $P_{out}$ and P−$_{out}$ and the sum of $P_{out}$ and P+$_{out}$ are less than the second comparative value B, the converter may select the modules of which the sum of the amounts of power is closer to the second comparative value B.

In another example, when all the amounts of power output by the solar cell modules 230a, 230b, and 230c are less than the first comparative value A, all the amounts of power output by the solar cell modules 230a, 230b, and 230c are added up. When the sum P1+P2+P3 is less than the second comparative value B, the solar cell modules 230a, 230b, and 230c are connected to a converter having a short operating time from among the converters 211a, 211b, and 211c, for example, the convert 211b. Accordingly, the series switch SWb and the parallel switches SW1 and SW2 are turned on. If the sum P1+P2+P3 of the output powers of the solar cell modules 230a, 230b, and 230c exceeds the second comparative value B, the output powers of the solar cell modules 230a, 230b, and 230c are added up. If the sum P1+P2 is greater than the second comparative value B and the sum P2+P3 is less than the second comparative value B, the solar cell modules 230b and 230c are connected to the converter 211b having a short operating time from among the converters 211a, 211b, and 211c. Accordingly, the series switch SWb and the parallel switch SW2 are turned on. The remaining solar cell module 230a may be connected to the converter 211a via the series switch SWa or may wait until power generation is next measured. When both the sum P1+P2 and the sum P2+P3 are greater than the second comparative value B, the solar cell modules 230a, 230b, and 230c are connected to the converters 211a, 211b, and 211c via the switches SWa, SWb, and SWc, respectively. When both the sum P1+P2 and the sum P2+P3 are less than the second comparative value B, the modules of which the sum is closer to the second comparative value, that is the sum P1+P2, are selected, and the selected modules are connected to the converter 211b having a short operating time from among the converters 211a and 211b. Accordingly, the series switch SWb and the parallel switch SW1 are turned on.

The output powers P2 and the output power P3 of the remaining solar cell modules 230b and 230c are added up.

When the sum P1+P2+P3 is less than the second comparative value B, the solar cell modules 230a, 230b, and 230c are connected to a converter having a short operating time from among the converters 211a, 211b, and 211c, for example, the converter 211b. Accordingly, the series switch SWb and the parallel switches SW1 and SW2 are turned on. If the sum P1+P2+P3 of the output powers of the solar cell modules 230a, 230b, and 230c exceeds the second comparative value B, the output powers of the solar cell modules 230a, 230b, and 230c are added up.

While various inventive aspects have been particularly shown and described with reference to exemplary embodiments, it will be understood by one of ordinary skill in the art that various changes in form and details may be made therein without departing from the spirit and scope of the present invention.

What is claimed is:

1. An energy storage system connected to a grid and a plurality of power generation modules, the system comprising:
   a plurality of converters for converting power generated by each of the plurality of power generation modules into DC power at a voltage level;
   a plurality of series switches connected to the plurality of power generation modules;
   a plurality of parallel switches configured to selectively connect each of the plurality of power generation modules to each and every other of the plurality of power generation modules; and
   a controller configured to control the plurality of series switches and the plurality of parallel switches in order to selectively connect each of the power generation modules to at least one converter, wherein the controller is configured to connect the power generation modules having generated power greater than a first reference value to a selected converter, wherein the controller comprises:
      a power generation measuring unit configured to measure the power generated by each of the plurality of the power generation modules;
      a calculator configured to compare each of the generated power with one or more reference values; and
      a switch controller configured to output control signals to the parallel and series switches in order to connect each of the power generation modules to the selected converter based on the comparison, wherein the switch controller is configured to selectively turn on the series switches connected to the power generation modules having generated power greater than the first reference value,
      wherein, if the sum of generated power of the power generation modules having generated power less than the first reference value is less than a second reference value, the switch controller is configured to turn on series and parallel switches in order to connect the power generation modules having the generated power less than the first reference value with a converter having the lowest operating hours from among the plurality of converters that are not operating,
      wherein, if the sum of the generated power of the power generation modules having generated power less than the first reference value is greater than the second reference value and if the sum of the generated power of two power generation modules having generated power less than the first reference value is less than the second reference value, the switch controller is configured to turn on the corresponding series and parallel switches in order to connect the two power generation modules with a converter having the lowest operating hours from among the plurality of converters that are not operating,
      wherein, if the sum of the generated power of the power generation modules having generated power less than the first reference value is greater than the second reference value and if the sum of the generated power of two power generation modules having generated power less than the first reference value is greater than the second reference value, the switch controller is configured to turn on the series switches connected to the two power generation modules.

2. The system of claim 1, wherein the selected converter has the lowest operating hours from among the plurality of converters that are not operating.

3. The system of claim 1, wherein the two power generation modules are adjacent to each other.

4. The system of claim 1, wherein the two power generation modules are placed next to each other.

5. The system of claim 1, wherein the power generation module comprises a solar cell.

6. The system of claim 1, further comprising:
   a battery; and
   one or more converters configured to charge the battery with power from the grid or with power from the plurality of power generation modules.

7. A method of controlling an energy storage system that is connected to a plurality of power generation modules, to a grid, and to a load, the method comprising:
   measuring power generated by each of the plurality of power generation modules;
   connecting one or more of the power generation modules to a selected converter by controlling a plurality of series switches connected to each of the plurality of power generation modules and a plurality of parallel switches selectively connecting each of the plurality of power generation modules to each and every other of the plurality of power generation modules, wherein the power generation modules having generated power greater than a first reference value are connected to the selected converter;
   converting power from the one or more power generation modules into DC power at a voltage level with the selected converter;
   comparing each of the generated powers with a reference value;
   outputting control signals to the series and parallel switches in order to connect each of the power generation modules to the selected converter based on the comparison, wherein the control signals turn on series switches connected to the power generation modules having generated power greater than the first reference value;
   determining whether the sum of the generated power of the power generation modules having generated power less than the first reference value is less than a second reference value;
   if the sum of the generated power is less than the second reference value, turning on series and parallel switches in order to connect the power generation modules having generated power less than the first reference value to a converter having the lowest operating hours from among the plurality of converters that are not operating;
   if the sum of the generated power of the power generation modules having the generated power less than the first reference value is greater than the second reference value, determining whether the sum of the generated power of two of the power generation modules having generated power less than the first reference value is less than the second reference value;
   if the sum of the generated power of the two power generation modules is less than the second reference value, turning on series and parallel switches in order to connect the two power generation modules to another selected converter; and
   if the sum of the generated power of the two power generation modules exceeds the second reference value, turning on the series switches connected to the two power generation modules.

8. The method of claim 7, wherein the selected converter has the lowest operating hours from among the plurality of converters that are not operating.

9. The method of claim 7, wherein the two power generation modules are adjacent to each other.

10. The method of claim 7, further comprising charging a battery with power from the grid or with power from the plurality of power generation modules.

\* \* \* \* \*